United States Patent [19]

Yamada et al.

[11] Patent Number: 4,807,176

[45] Date of Patent: Feb. 21, 1989

[54] MANCHESTER TYPE CARRY PROPAGATION CIRCUIT

[75] Inventors: Akira Yamada; Toyohiko Yoshida; Hiromasa Nakagawa, all of Itami, Japan

[73] Assignee: Mitsubishi Denki Kabushiki Kaisha, Tokyo, Japan

[21] Appl. No.: 838,302

[22] Filed: Mar. 10, 1986

[30] Foreign Application Priority Data

Jul. 12, 1985 [JP] Japan ................................ 60-154548

[51] Int. Cl.$^4$ .............................................. G06F 7/50
[52] U.S. Cl. ..................................................... 364/786
[58] Field of Search ................ 364/768, 784, 787, 786

[56] References Cited

U.S. PATENT DOCUMENTS

| 3,919,536 | 11/1975 | Cochran et al. | 364/782 |
| 4,179,746 | 12/1979 | Tubbs | 364/768 |
| 4,357,675 | 11/1982 | Freyman | 364/786 |
| 4,408,136 | 10/1983 | Kirsch | 307/363 |
| 4,523,292 | 6/1985 | Armer | 364/786 |
| 4,538,239 | 8/1985 | Magar | 364/759 |
| 4,584,660 | 4/1986 | Young et al. | 364/786 |
| 4,661,930 | 4/1987 | Tran | 365/201 |
| 4,677,584 | 6/1987 | Steck | 364/784 |

FOREIGN PATENT DOCUMENTS 0147836  7/1985  European Pat. Off. ............ 364/787

OTHER PUBLICATIONS

"Introduction to VLSI Systems", Carver Mead et al., Addison Wesley, pp. 150-151.

Primary Examiner—Gary V. Harkcom
Assistant Examiner—Dale M. Shaw
Attorney, Agent, or Firm—Lowe, Price, LeBlanc, Becker & Shur

[57] ABSTRACT

A Manchester type carry propagation circuit of this invention has a precharge clock signal (24) applied to the gate of an NMOS transistor (23) having a high threshold, to precharge a carry signal line (22) to an intermediate potential. When a carry signal (27) of the preceding stage attains to the "H" level, a transistor (26) turns on to transmit the potential of the carry signal line (22) to the succeeding stage, and when a carry propagation signal (37) attains to the "H" level, a transistor (36) turns on to propagate a carry of the preceding stage to the carry signal line (22). Then, the intermediate level of the carry signal line (22) is pulled up to the level of the source potential (21) by a pull-up circuit (30). Consequently, the level of the carry signal line (22) can be propagated to the succeeding stage at high speed.

12 Claims, 2 Drawing Sheets

MANCHESTER TYPE CARRY PROPAGATION CIRCUIT

BACKGROUND OF THE INVENTION

1. Field of the Invention

This invention relates to a Manchester type carry propagation circuit. More particularly, this invention relates to a Manchester type carry propagation circuit for propagating a carry generated in performing operations by an arithmetic logic unit.

2 Description of the Prior Art

A Manchester type carry propagation circuit for propagating carry generated in performing operations by an arithmetic logic unit is known by Carver Mead et al. "Introduction to VLSI Systems", ADDISON WESLEY.

FIG. 1 is an electric circuit showing major portions of a precharge section of a bit of the prebeding stage and a carry propagation section of the succeeding stage. First, a conventional Manchester type carry propagation circuit will be described with reference to FIG. 1. Referring to FIG. 1, the NMOS transistor 1 is to precharge carry signal line 5. The NMOS transistor 2 turns on/off in response to a carry propagation signal 6, and the NMOS transistor 3 turns on/off in response to a carry clear signal 8. The NMOS transistor 4 works in response to the carry propagation signal 7, to propagate a carry of the preceding stage to the succeeding one.

When a precharge clock signal $\phi 1$ is applied to the gate of the NMOS transistor 1, this NMOS transistor 1 becomes conductive and precharges the carry signal line 5. And when the carry propagation signal 6 becomes "L", the NMOS transistor 2 becomes non-conductive, and the signal line 7 becomes "H". In response to this, the transistor 4 becomes conductive, and carry 10 of the preceding stage is propagated across the carry signal line 5 to the succeeding stage. In this Manchester type carry propagation circuit shown in FIG. 1, the carry signal line 5 is adapted to be precharged before the NMOS transistor 2 becomes conductive, so that the carry "H" can be transmitted to the succeeding stage without time delay.

In propagating a carry of "L" level to the succeeding stage, the transistor 1 becomes conductive by the precharge clock signal $\phi 1$, as described above, and precharges the carry signal line 5. When the carry propagation signal 6 becomes "L", the NMOS transistor 2 becomes non-conductive, the signal line 7 becomes "H", and the carry propagating transistor 4 becomes conductive. Due to the fact that this transistor 4 became conductive, electric potential of the carry signal line 5 becomes "L" gradually.

Thus, in the conventional Manchester type carry propagation circuit, the "H" level of the carry 10 need not be propagated, as the carry signal line 5 has reached the "H" level by the time when the carry 10 of the preceding stage reaches the "H" level. However, when the carry 10 is at the "L" level, that level is propagated to the carry signal line 5 through the carry propagating transistor 4. In this case, the carry signal line 5 has attained the "H" level (5V) during the precharge period, and if the carry 10 of the preceding stage reaches "H" in this condition, the carry signal line 5 begins to discharge. At this time, even if the carry propagation signal 6 reaches the "H" level, the carry propagating transistor 4 does not become conductive until the voltage at the carry signal line 5 becomes lower than the gate voltage of the carry propagating transistor 4 by more than the threshold voltage Vth of this transistor. Therefore, a period of time after the carry propagation signal 6 reached the "L" level until the carry propagating transistor 4 becomes conductive becomes wasteful, and even if all bits of the carry propagation signal 6 are set simultaneously, a substantial time is required until the level of the carry signal line 5 becomes the final carry propagation output, resulting in a disadvantage that the speed of operation slows down.

SUMMARY OF THE INVENTION

Accordingly, a principal object of this invention is to provide a Manchester type carry propagation circuit which can propagate a carry signal on a carry signal line at high speed.

Briefly described, this invention comprises a Manchester type carry propagation circuit for propagating a carry from a carry signal line in a less significant bit in a full adder implemented with a transistor circuit, wherein a charge means is provided for setting the precharge potential at the output of the carry signal line at an intermediate level of about a half of the source voltage.

Therefore, according to this invention, since the precharge potential of the carry signal line is set at an intermediate level of about a half of the source voltage, a carry propagating transistor can be rendered conductive simultaneously with the propagation of the carry propagation signal to the succeeding stage, and a carry signal can be rapidly propagated.

In a preferred embodiment of this invention, a charge means is structured such that a first transistor having a high threshold is connected between a first reference potential and a carry signal line to control the first transistor with precharge clock signals to precharge the carry signal line, and a second transistor is connected between the carry signal line and a second reference potential to control the second transistor with precharge clock signals, to set the value of the carry signal line of the intermediate level at the time of carry propagation at a high level by a pull-up circuit.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
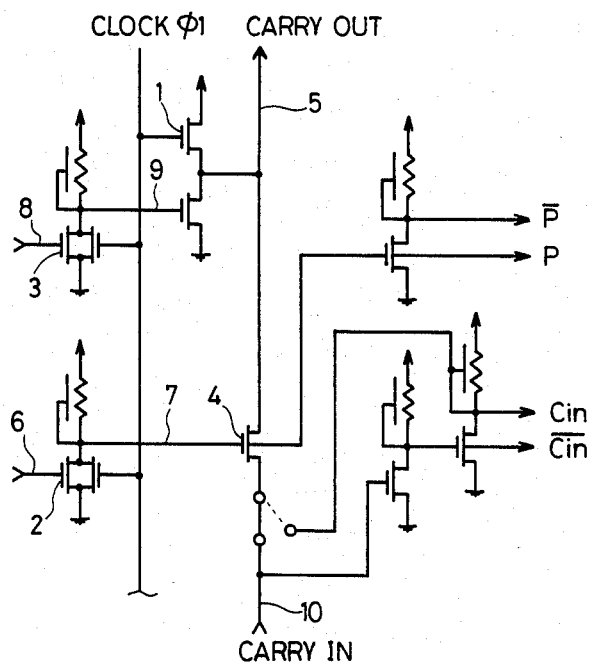
FIG. 1 is a schematic diagram of an electric circuit showing a main part of a conventional Manchester type carry propagation circuit.
Figure 2:
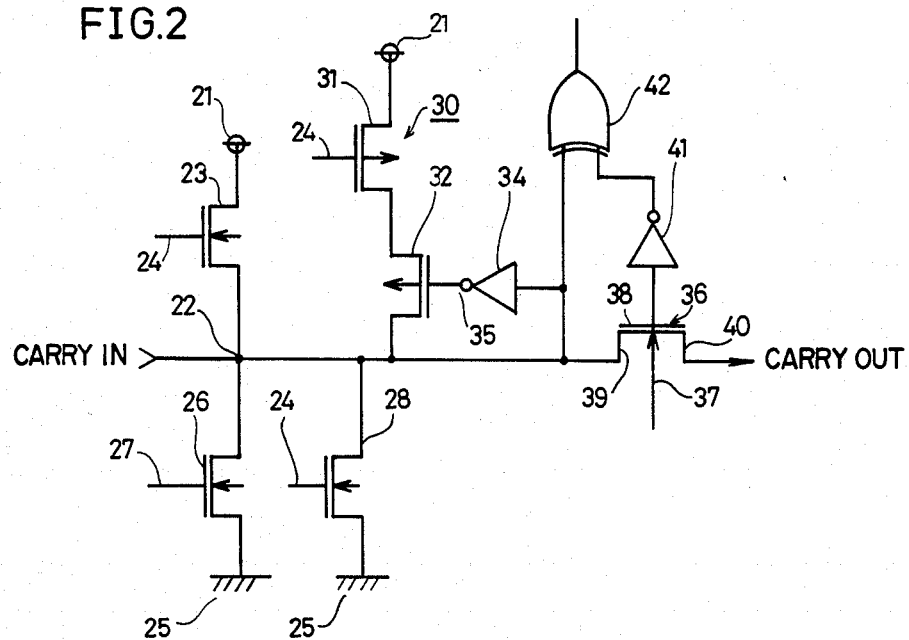
FIG. 2 is a schematic diagram of an electric circuit showing a main part of one embodiment of this invention.

FIG. 2 is a schematic diagram of an electric circuit showing a main part of one embodiment of this invention.

Referring to FIG. 2, the structure of one embodiment of this invention will be described. An NMOS transistor 23 having a high threshold for precharging a carry signal line 22 is connected between a source voltage (+5V) as a first reference potential and a carry signal line 22. A precharge clock signal 24 is applied to the gate of this transistor 23. Also, an NMOS transistor 26 for propagating a carry signal is connected between the carry signal line 22 and the ground potential as a second reference potential. A carry signal 27 from the preceding stage is applied to the gate of this transistor 26.

In addition, a pull-up circuit 30 is connected between the carry signal line 22 and the source potential 21. The pull-up circuit 30 is to pull up the level of the carry signal line 22 from the intermediate level to the "H" level. To this end, the pull-up circuit 30 is composed of two PMOS transistors 31, 32, which are connected in series between the source potential 21 and the carry signal line 22. A precharge clock signal 24 is applied to the gate of one PMOS transistor 31, and when the precharge clock signal 24 is at the "L" level, this PMOS transistor 31 is rendered conductive. Meanwhile, an inverted output signal 35 of an inverter 34 for inverting the signal on the carry signal line 22 is applied to the gate of the other PMOS transistor 32. Thus, the PMOS transistor 32 becomes conductive when the carry signal line 22 is at the "H" level and the inverted output signal 35 of the inverter 34 reaches the "L" level.

An NMOS transistor 28 as well as the aforementioned precharge transistor 23 is connected between the carry signal line 22 and the ground potential 25. A precharge clock signal 24 is applied to the gate of this NMOS transistor 28.

Furthermore, the carry signal line 22 is connected to the source of a carry signal propagating transistor 36. A carry signal from the preceding signal is applied to the drain 40, and a carry propagation signal 37 to the succeeding stage is applied to the gate 38, of the carry signal propagating transistor 36. The carry propagation signal 37 is also applied to the input of an inverter 41, and the output end of the inverter 41 is connected to one input end of an EXOR gate 42. The carry signal line 22 is connected to the other input end of this EXOR gate 42.

Now, a specific operation of one embodiment of this invention will be described. First, a precharge clock signal 24 is applied to the gate of the NMOS transistor 23, then this NMOS transistor 23 becomes conductive, and the carry signal line 23 is precharged. For example, suppose the threshold voltage Vth of the NMOS transistor 23 is about 1.5V, then the carry signal line 22 is kept at a potential on the intermediate level of about 3.5V. ON this occasion, if an operation is a less significant bit results in a carry from that bit, the carry signal line 27 of the preceding stage attains the "H" level to render the transistor 26 conductive. Thereby, the "L" level of the carry signal line 22 is propagated to the succeeding stage through the transistor 26. When the carry propagation signal 37 attains the "H" level, the carry propagating transistor 36 immediately becomes conductive, as the potential difference between the source 39 and the gate 38 of the carry propagating transistor 36 is higher than the threshold voltage Vth of the transistor 36, and the carry signal of the preceding stage, which is applied to the drain of the carry propagating transistor 36, is propagated to the carry signal line 22.

Since all bits of the carry propagation signal 37 are set simultaneously, the carry propagating transistors of the bits having carries to be propagated are rendered conductive simultaneously, with the result that the "L" level signal on the carry signal line 22 is propagated at high speed. The operation of each bit is performed by the evaluation of the exclusive logic sum of the value of the carry signal line 22 which is propagated as described above and the value of the inverted signal of the carry propagation signal 37 inverted by the inverter 41, which is evaluated by the EXOR gate 42.

Now, if the value of the carry signal line 22 is at the "L" level, that signal can be used directly as an output signal to the EXOR gate 42. However, if the value of the carry signal line 22 is at an intermediate level, that potential of the intermediate level is required to be drawn to the source voltage +5V when the precharge clock signal 24 is at the "L" level, to apply it to the EXOR gate 42.

To this end, a pull-up logic circuit 30 is provided. This pull-up logic circuit 30 is composed of two PMOS transistors 31, 32, which are connected between the carry signal line 22 and the source potential 21. When the signal of the intermediate level on the carry signal line 22 is inverted by the inverter 34 causing the inverted signal 35 to be at the "L" level to render the PMOS transistor 32 conductive, and when the precharge clock signal 24 attains the "L" level causing the PMOS transistor 31 to be conductive, the potential of the carry signal line 22 is drawn to the source potential +5V.

By using the circuit constructed as above, the "L" signal will be outputted directly to the EXOR gate 42 when the value of the carry signal line 22 is at the "L" level, and the carry signal line 22 is pulled up to the "H" level by the pull-up logic circuit 30 to provide it to the EXOR gate 42 when the carry signal line 22 is at the intermediate level.

At this time, the carry signal line 22 is pulled up to the source voltage 5V, but the carry signal line 22 will be set at the intermediate level (about 3.5V) by means of the NMOS transistor 23 having the high threshold voltage Vth for precharging a semiconductor and by means of the NMOS transistor 28, during the next precharge period. Meanwhile, the NMOS transistor 28 has a parameter set such that the potential of the carry signal line 22 may be the desired value of the intermediate level, as a function of the on-state ratio of the transistor 23. The operation of each bit is set up after the definition of the value of the carry signal line 22 of each bit as described above, and it is performed by evaluating the exclusive logic sum of said value of the carry signal line 22 and the inverted signal of the carry propagation signal 37 to the succeeding stage obtained by the inverter 41, by means of the EXOR gate 42.

As described in the foregoing, when the carry signal line 22 propagates its signal to the succeeding stage, the carry signal line 22 is precharged to the intermediate level, and when the value of the carry signal line 22 of the intermediate level is used for the operation of the bit, the level is pulled up to the "H" level, so that the level of the carry signal line 22 can be propagated to the succeeding stage at high speed, and also the operation can be performed reliably using that level.

Figure 3:
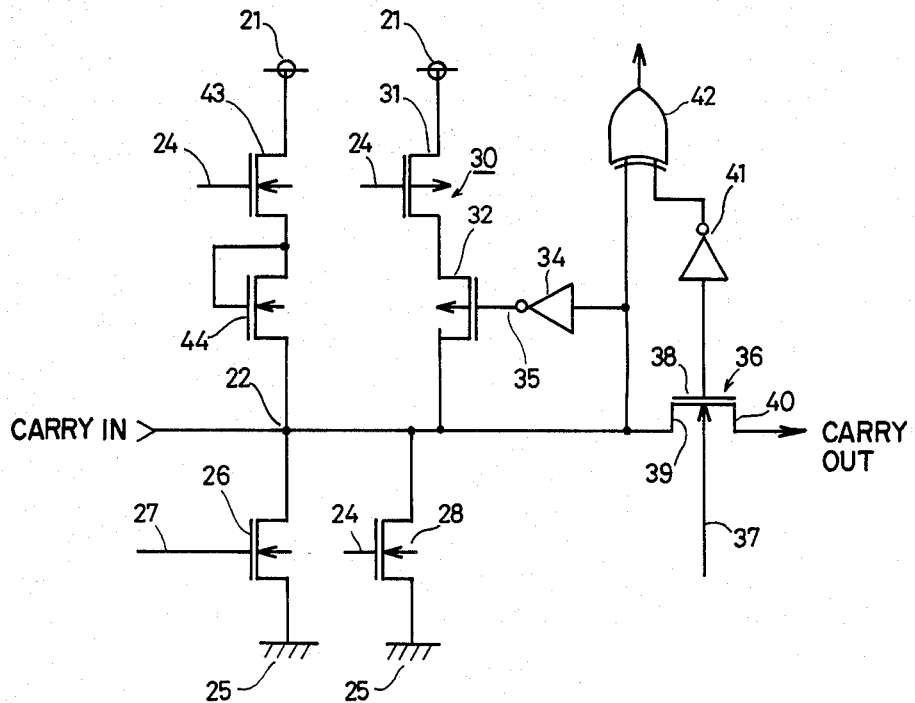
FIG. 3 is a schematic diagram of an electric circuit showing a main part of another embodiment of this invention.

FIG. 3 is a schematic diagram of an electric circuit showing the main part of another embodiment of this invention. This embodiment of FIG. 3 comprises, instead of said precharge transistor 23 having high threshold voltage Vth shown in FIG. 2, ordinary transistors 43, 44, having threshold voltages of about 0.7V which are connected in series between the source 21 and the carry signal line 22, to apply a precharge clock signal 24 to the gate of the transistor 43, and the gate of the transistor 44 is connected to the node 45. Thus, by applying the precharge clock signal 24 to the gate of the transistor 43 to precharge the carry signal line 22, the carry signal line 22 is set at the potential of the intermediate level, so that the same effect as the embodiment of FIG. 2 described above can be obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A Manchester type carry propagation circuit for propagating a carry from a carry signal line of a less significant bit in a full adder composed of a transistor circuit, comprising:
   sources of first and second supply potentials wherein said first supply potential is greater than said second supply potential; and charge means to precharge the output of said carry signal line to a precharge voltage level, said precharge voltage level having an intermediate potential which is less that said first supply potential and greater that said second supply potential said charge means including:
   first transistor switching means having a predetermined threshold, connected between said source of first supply potential and said carry signal line, receiving a precharge clock signal as a control signal;
   second transistor switching means connected between said carry signal line and said source of second supply potential, receiving said precharge clock signal as a control signal, to set the potential of said carry signal line at said precharge voltage level as a function of the on-state resistance ratio of said first transistor; and
   a pull-up circuit connected between said source of first supply potential and said carry signal line, to pull up to a high level the value of the carry signal line of said precharge voltage level at the time of said carry propagation.

2. A Manchester type carry propagation circuit in accordance with claim 1, wherein
   said pull-up circuit comprises first and second MOS transistors connected in series between said source of first supply potential and said carry signal line.

3. A Manchester type carry propagation circuit in accordance with claim 2, wherein said precharge clock signal is applied to the gate of said first MOS transistor, and
   an inverter connected between the gate of said second MOS transistor and said carry signal line.

4. A Manchester type carry propagation circuit in accordance with claim 1, wherein
   each of said first and second transistor switching means is composed of an N channel MOS transistor.

5. A Manchester type carry propagation circuit in accordance with claim 4, wherein
   said first supply potential is +5V DC potential and a threshold voltage of said first transistor switching means is 1.5V.

6. A Manchester carry propagation circuit in accordance with claim 1 wherein said first transistor switching means comprises a MOSFET having a threshold voltage substantially higher than a threshold voltage of said second transistor switching means.

7. A Manchester carry propagation circuit in accordance with claim 1 wherein said first transistor switching means has a threshold value substantially equal to said first supply potential minus said precharge voltage level.

8. A Manchester carry propagation circuit for propagating a carry from a carry signal line of a less significant bit in a full adder composed of a transistor circuit, comprising:
   sources of first and second supply potentials, wherein said first supply potential is greater than said second supply potential; and
   charge means to precharge the output of said carry signal line to a precharge voltage level, said precharge voltage level having an intermediate potential which is less that said first supply potential and greater that said second supply potential, intermediate voltage level being a predetermined portion of a supply voltage potential, said portion being at least half of said charge means including:
   first transistor switching means connected between said source of first supply potential and said carry signal line, receiving a precharge clock signal as a control signal;
   a second transistor switching means having a threshold voltage lower than a threshold voltage of said first transistor switching means, said second transistor switching means connected between said carry signal line and said source of second supply potential, receiving said precharge clock signal as a control signal, to set the potential of said carry signal line at said precharge voltage level; and
   a pull-up circuit connected between said source of first supply potential and said carry signal line, to pull up to a high level the value of the carry signal line of said precharge voltage level at the time of said carry propagation.

9. A Manchester carry propagation circuit in accordance with claim 8 wherein said first transistor switching means comprises a plurality of series connected transistors.

10. A Manchester carry propagation circuit in accordance with claim 8 wherein said first transistor switching means has a threshold voltage substantially equal to said first supply potential minus said precharge voltage level.

11. A Manchester carry propagation circuit for propagating a carry from a carry signal line of a less significant bit in a full adder composed of a transistor circuit, comprising:
   sources of first and second supply potentials, wherein said first supply potential is greater than said second supply potential; and
   charge means to precharge the output of said carry signal line to a precharge voltage level, said precharge voltage level having an intermediate potential which is less that said first supply potential and greater that said second supply potential said precharge voltage level being a predetermined portion of a first supply potential, said portion being at least half of said first supply potential, said charge means including:
   first transistor switching means having a predetermined threshold voltage and comprising a MOSFET connected between said first source of supply potential and said carry signal line and receiving a precharge clock signal as a control signal;

second transistor switching means having a threshold voltage such that said threshold voltage of said first transistor switching means is higher than said threshold voltage of said second transistor switching means, said second transistor switching means receiving said precharge clock signal as a control signal to set the potential of said carry signal line at said precharge voltage level; and a pull-up circuit connected between said source of first supply potential and said carry signal line, to pull up to a high level the value of the carry signal line of said precharge voltage level at the time of said carry propagation.

12. A Manchester carry propagation circuit in accordance with claim 11 wherein said first transistor switching means has a threshold voltage substantially equal to said first supply potential minus said precharge voltage level.

* * * * *